United States Patent Office 2,702,846
Patented Feb. 22, 1955

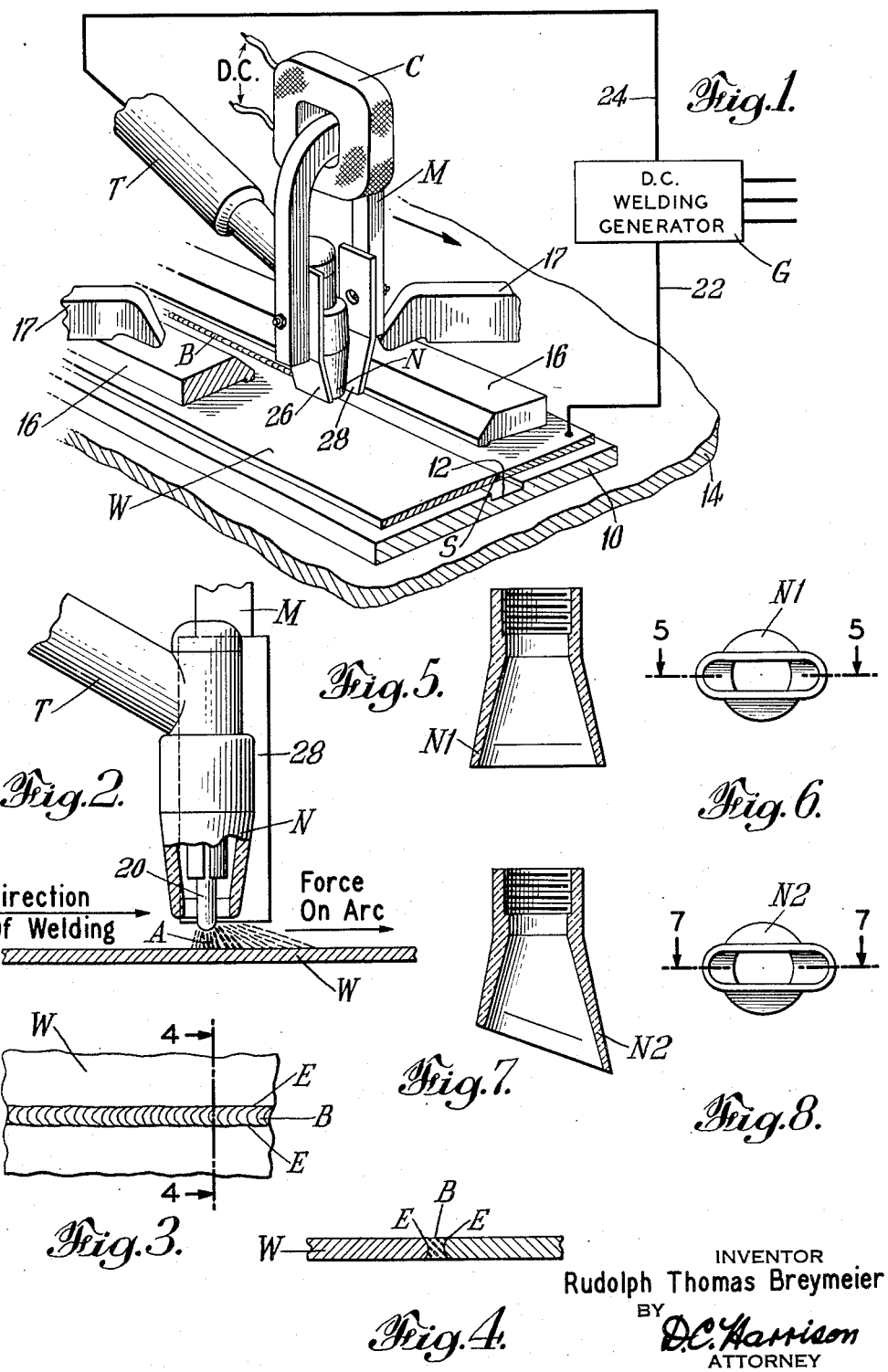

2,702,846

NOBLE MONATOMIC GAS SHIELDED MAGNETIC FIELD CONTROLLED ELECTRIC ARC WELDING PROCESS AND APPARATUS

Rudolph Thomas Breymeier, Niagara Falls, N. Y., assignor, by mesne assignments, to Union Carbide and Carbon Corporation, a corporation of New York Application June 20, 1950, Serial No. 169,166

12 Claims. (Cl. 219—10)

This invention relates to electric arc welding, and more particularly to inert noble monatomic gas shielded, direct current, mechanized arc welding of metal with a substantially non-consumable electrode.

This type of welding, especially when the noble monatomic gas is argon, is subject to undesirable undercutting along the lateral edges of the weld when the progress of the welding operation exceeds a certain speed range. This has the disadvantage of limiting the speed of welding. For example, in so welding sheets of stainless steel (which is substantially non-magnetic) having a thickness of sixteen-gauge (United States Standard), i. e., 0.0613 inch thick, a welding speed of greater than 30-40 inches per minute results in a weld having undercut edges.

The main object of this invention is to provide a novel method of and means for improving the contour of the weld by eliminating such undercutting at high welding speed.

According to the invention, a constant relatively weak magnetic field is disposed at right angles to the direction of the weld and to the arc and to the stream of noble monatomic gas, which field deflects the arc substantially ahead of the tip of the electrode, and effectively minimizes objectionable undercutting of the weld, even when the welding speed is increased to a range of 50-60 inches per minute, which may be as much as one-hundred percent faster than that possible prior to the invention. By simply reversing the direction of such field, deep undercutting can be produced, if desired, since the arc is then blown back of the electrode tip.

In the drawing:

Fig. 1 is a fragmentary perspective view of apparatus illustrating the invention in operation;

Fig. 2 is a fragmentary view partly in side elevation and partly in section of the apparatus, showing how the arc is blown ahead of the torch by the magnetic field;

Fig. 3 is a plan view of the welded work;

Fig. 4 is an enlarged cross sectional view of such work taken on line 4—4 of Fig. 3;

Fig. 5 is a vertical sectional view taken on line 5—5 of Fig. 6, illustrating a novel modification of the gas cup or nozzle;

Fig. 6 is a bottom plan view of such modification; and

Figs. 7 and 8 are views similar to Figs. 5 and 6, respectively, of another modification.

As shown in Fig. 1, the work W to be welded is mounted on a back-up bar 10 composed of copper, with the welding seam S located centrally above a groove 12 in such bar. The bar 10 rests on an aluminum support 14. Clamp-down bars 16, 16 composed of iron or stainless steel are disposed on the work W in slightly spaced parallel relation to each other and to the seam S. The parts are held in place by clamps 17, 17.

A noble monatomic gas blanketed arc welding torch T of the type disclosed in the patent to Meredith, No. 2,376,265, for example, is supported above the seam S to be welded, by a suitable machine, not shown, which is adapted to drive the torch T at a constant speed along a path parallel to the seam S during the so mechanized welding operation.

Noble monatomic gas is continuously supplied to the torch T from a suitable source during the welding operation, such gas being discharged from a ceramic cup or nozzle N surrounding a tungsten electrode 20. The work W and the electrode are connected by insulated cables 22 and 24 to a suitable source of direct current, such as a welding generator G, the polarity of the work being positive with respect to that of the electrode which is negative. Thus, a welding arc is energized between the tip of the electrode and the work as the electrode tip is advanced in substantially constantly spaced relation to the seam to be welded. The work is progressively fused by the arc and welded at B along the seam as the arc moves with the electrode tip enveloped in the stream of noble monatomic gas discharged by the cup N.

Prior to the invention a set-up of the type described above resulted in the welding of a seam in which the final weld had seriously undercut lateral edges at E when the progress of the torch exceeded a relatively low maximum speed with respect to the work.

Such trouble is overcome, according to the present invention, by an electro-magnet comprising a coil C and a magnet M mounted on the machine (not shown) supporting the torch T for movement therewith. The magnet M is of the horseshoe type and has pole-pieces 26 south, or south-seeking, and 28 north, or north-seeking, disposed on opposite sides of the nozzle N, so that the resulting magnetic field is substantially horizontal, and blows the welding arc A ahead of the nozzle N during the welding pass. As a result, undercutting is eliminated to such an extent that acceptable welds can be made at a substantially higher welding speed than that possible without the aid of such magnetic field.

A magnetic field of variable strength between the pole-pieces is obtained by connecting the coil C on the yoke of the magnet to a suitable source of direct current (not shown) which may be adjustable.

As a specific example of the invention, flat-surfaced welds B were made on 16-gauge stainless steel sheets W at welding speeds of 50-60 inches per minute. The arc A was energized by direct current supplied by a 300-ampere D. C. welding generator G, the welding voltage being 8-16 volts. The welding current was straight polarity at about 260 amperes. One-eighth inch diameter tungsten electrodes 20 were used in a torch T having ceramic gas cups N in most cases, although some tests with metallic water-cooled gas cups indicated that these did not noticeably interfere with the magnetic field or its effect on the arc A. The work W was clamped over a ⅛ inch deep by ⅝ inch wide groove 12 in a ½ inch thick copper back-up bar 10 which, in turn, was supported by a wide flange beam 14 composed of non-magnetic metal, such as aluminum. Both iron and stainless steel clamp-down bars 16 were used with no noticeably different effect.

A magnet M producing a horizontal magnetic field of 100-200 gausses maximum intensity at right angles to the weld direction was provided with a small coil C and means (not shown) for adjusting the field to very low strengths. With this type of electromagnet, welds B free from undercutting, as shown in Figs. 3 and 4, were produced by deflecting the arc A substantially ahead of the electrode 20, so that the tip of the arc flame extended some 1 to 3 inches ahead of the gas cup N. In such case the magnetic field intensity was about 50-150 gausses across the area of the welding arc (measured without such arc).

Conventional gas cups N of ceramic material are not ideally suited for use with this type of arc for two reasons. First, they have a tendency to overheat at the front edge and second, they do not offer adequate protection to the arc A which is no longer centered under the electrode but inclined at quite an angle toward the direction of welding. Metallic, water-cooled gas cups have been used and do not, apparently, hinder the magnetic influences on the arc, but they too have a tendency to suffer from overheating at the front edge.

Such objections are avoided by gas cups N1 and N2 shaped as shown in Figs. 5 and 7. The cup or nozzle N1, Figs. 5 and 6, is transversely flattened, and flared in the direction of the weld, so that the arc A is more fully shielded from the atmosphere by the noble monatomic gas, and less obstructed by the lower edge of the cup as the arc is blown forwardly of the electrode tip during the welding operation.

Somewhat similarly the cup or nozzle N2, Figs. 7 and 8, is transversely flattened, and flared in the direction of the weld.

Helium gas may be substituted for argon gas as the arc shielding medium, and the invention obviously is suitable for seam welding other metals than stainless steel. Furthermore, the electrode may be composed of any refractory material, such as carbon or graphite, as well as tungsten, without departing from the invention. If deep undercutting is desired, this can be accomplished by simply reversing the poles of the magnet, so that the arc is blown back of the electrode. In general, the higher the arc welding current—the weaker the field strength of the magnet for satisfactory weld contour, i. e., those which are flat and free of undercutting.

I claim:

1. In the art of noble monatomic gas shielded electric arc welding which is normally subject to undercutting of the work at the edges of the weld when the welding speed exceeds a certain value, the method of avoiding such undercutting and increasing the speed of welding substantially higher than said value, which comprises the step of subjecting the noble monatomic gas shielded arc to the influence of a relatively weak magnetic field derived from a variable strength source, fixed substantially at right angles to the direction of the weld and substantially at right angles to the longitudinal axis of the arc, so that the arc is constantly blown forwardly by such magnetic field as the welding operation progresses without undercutting the resulting weld.

2. Process increasing the speed of noble monatomic gas shielded direct current refractory electrode mechanized electric arc welding without undercutting, which comprises arranging metal to form a seam to be welded, advancing a refractory metal electrode and a stream of noble monatomic gas at a constant rate with the electrode tip in substantially constantly spaced relation to the seam of the work to be welded, while energizing a direct current welding arc between such electrode tip and the work through a welding current path which includes the work and such electrode, the polarity of the work being positive with respect to that of the electrode so that the work is fused and welded along said seam as the arc moves with the electrode tip enveloped in such noble monatomic gas stream, and moving a relatively weak magnetic field derived from a variable strength source with the electrode, said magnetic field being relatively fixed so that the arc is constantly blown ahead of the electrode tip, and the strength of said field is such that the resulting weld is flat-surfaced and free of undercutting even when the speed of the electrode with respect to the work is substantially higher than that possible without such magnetic field.

3. Process of welding, as defined by claim 2, in which the noble monatomic gas is argon, the electrode is tungsten, the work is non-magnetic sheet metal composed of stainless steel.

4. Apparatus for electric arc welding which is subject to undesirable undercutting when the welding speed is increased above a certain value, comprising a torch having a welding arc electrode surrounded by a nozzle adapted to discharge a stream of noble monatomic gas about the tip of said electrode during the welding operation, and an electromagnet provided with pole-pieces located at opposite sides of the nozzle, so that the magnetic field thereof is effective to constantly blow the arc in a direction ahead of the electrode to thereby substantially increase the speed of welding above such certain value without undercutting the resulting weld.

5. Apparatus for electric arc welding which may produce undesirable undercutting when the welding speed is increased, comprising a torch having a welding arc electrode surrounded by a nozzle adapted to discharge a stream of noble monatomic gas about the tip of said electrode during the welding operation, and an electro-magnet effective to constantly blow the arc forwardly with respect to the electrode to thereby substantially increase the speed of welding and reduce undercutting of the resulting weld, in which the nozzle wall is laterally flattened, and flared in the direction of travel of the apparatus, whereby the gas which is discharged by the nozzle shields the arc from the atmosphere when the arc is so blown in the direction of travel of the apparatus.

6. Apparatus for electric arc welding, as defined by claim 5, in which said nozzle is tilted, so that the arc is free of interference with the nozzle when the arc is so blown in the direction of travel of the apparatus.

7. The combination with a gas shielded electrode-electric arc torch having a transversely flattened gas discharge nozzle surrounding an electrode tip, of an electromagnet operatively associated with torch so that the poles of the electro-magnet are located opposite the long sides of said nozzle near the tip of the electrode, whereby the effective field of the electromagnet is substantially transverse to the normal direction of movement of the torch, and is effective to constantly blow the arc substantially parallel to such direction during the operation of the torch.

8. The combination of claim 7, in which the nozzle is flared so as to shield the so blown arc from the atmosphere with the gas discharged therefrom, without otherwise interfering with the arc.

9. Process of seam welding relatively hard-to-weld metals of the class consisting of aluminum and stainless steel which are non-magnetic, which comprises arranging the parts of such metal to be welded to provide a seam, striking a welding arc between such metal at such seam and an electrode, shielding such arc and the adjacent heated metal with a stream of gas composed essentially of a noble monatomic gas of the class consisting of argon and helium, moving such electrode and stream along such seam, progressively fusing the metal parts as the arc advances with such electrode and the noble monatomic gas stream, such movement exceeding the speed which ordinarily would result in undercutting of the work along the edge of the resulting weld under otherwise normal conditions, and constantly blowing the arc forwardly of the direction of such movement by a relatively weak magnetic field derived from a variable strength source disposed substantially at right angles to such arc, whereby the weld is relatively flat and the work is free of undercutting along the edge thereof, even at such increased welding speed, by virtue of such forwardly blown arc.

10. The method of increasing the speed of travel of a gas shielded metal arc welding process that is otherwise subject to undercutting of the weld when the speed of travel exceeds a certain maximum value, which method comprises the step of biasing the arc forwardly with an electromagnet so that such arc assumes a substantially leading angle in the direction of travel of the welding operation, thereby making possible a substantially higher speed of travel without undercutting the resulting weld, and carrying out the process at a traveling speed which exceeds such certain value, leaving a weld that is free of undercutting.

11. In the art of monatomic gas shielded arc metal working, the process of controlling the contour of the resulting worked metal which comprises the step of subjecting the arc to the influence of a magnetic field derived from a variable strength source, disposed in relatively fixed position substantially at right angles to the direction of the path of movement of the arc and substantially at right angles to the longitudinal axis of the arc, so that the arc is constantly blown in the direction of such path for controlling the resulting contour of the so worked metal.

12. Metal working as defined by claim 11, in which the metal being worked is substantially non-magnetic, and the arc shielding gas is composed of argon.

References Cited in the file of this patent

UNITED STATES PATENTS

| Number | Name | Date |
|---|---|---|
| 1,580,020 | Cutler et al. | Apr. 6, 1926 |
| 1,740,381 | Weed | Dec. 17, 1929 |
| 1,787,600 | Strobel | Jan. 6, 1931 |
| 1,854,536 | Wilson | Apr. 19, 1932 |
| 1,946,305 | Catlett | Feb. 6, 1934 |
| 1,947,077 | Chapman | Feb. 13, 1934 |
| 2,053,417 | Brace | Sept. 8, 1936 |
| 2,259,118 | Sommerville et al. | Oct. 14, 1941 |
| 2,376,265 | Meredith | May 15, 1945 |
| 2,475,183 | Gibson | July 5, 1949 |
| 2,504,868 | Muller | Apr. 18, 1950 |

FOREIGN PATENTS

| Number | Country | Date |
|---|---|---|
| 687,215 | France | Apr. 22, 1930 |
| 371,814 | Great Britain | Apr. 19, 1932 |